June 28, 1960

W. S. RAYNOR 2,942,717

PALLET LOADING MACHINE

Filed Aug. 20, 1956

INVENTOR
WARREN S. RAYNOR

BY Mead, Browne, Schuyler & Beveridge

ATTORNEY

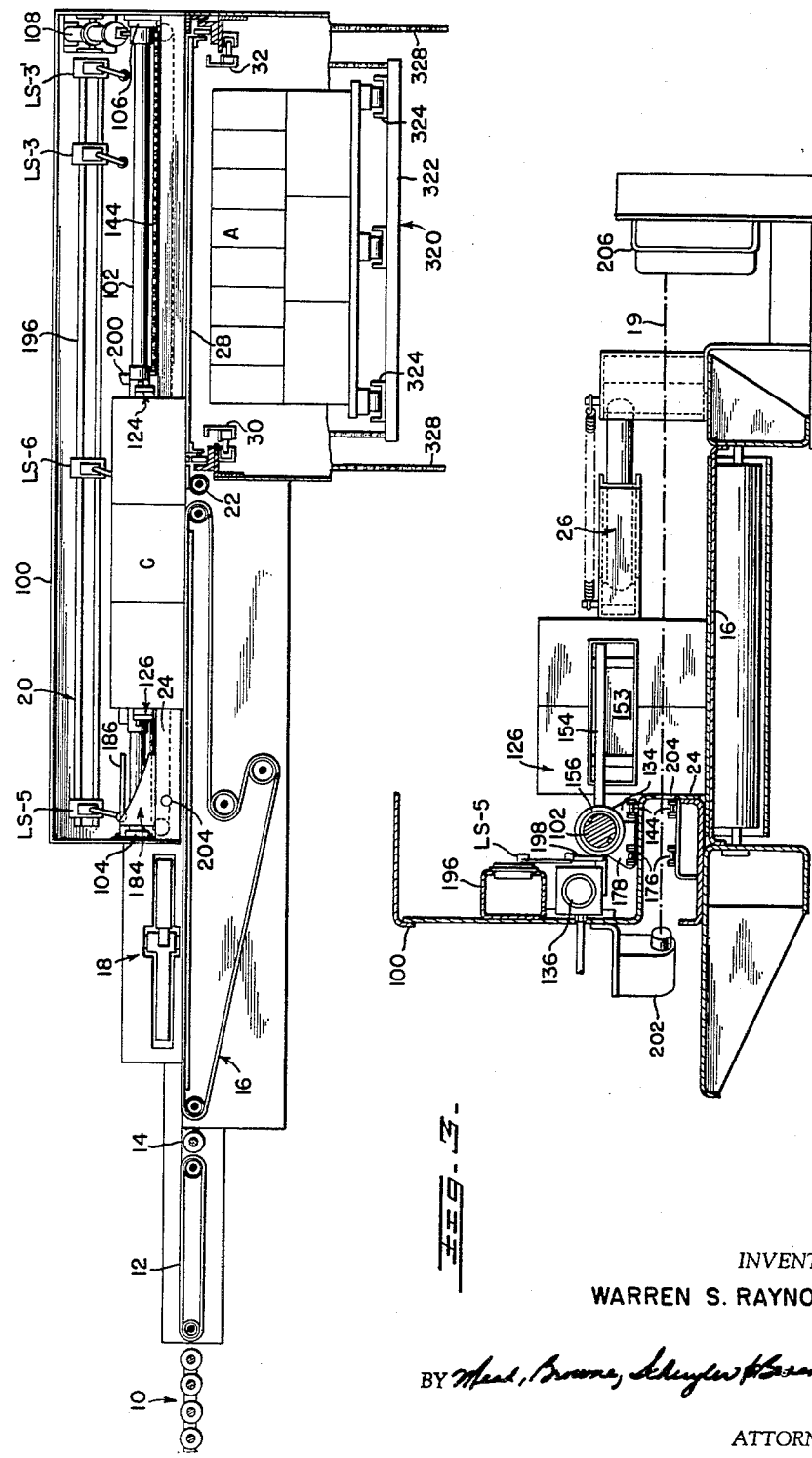

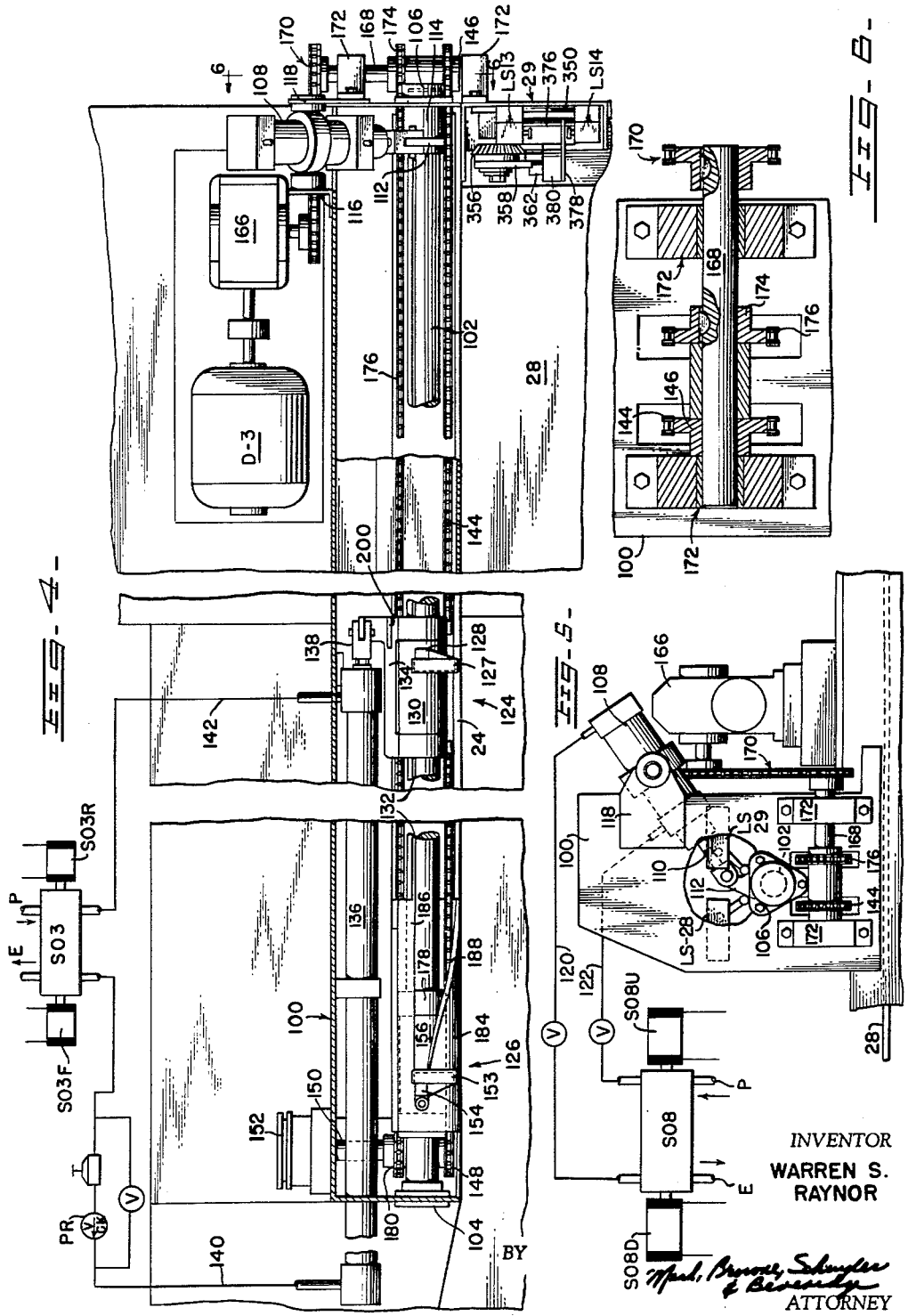

June 28, 1960 W. S. RAYNOR 2,942,717
PALLET LOADING MACHINE
Filed Aug. 20, 1956 8 Sheets-Sheet 4
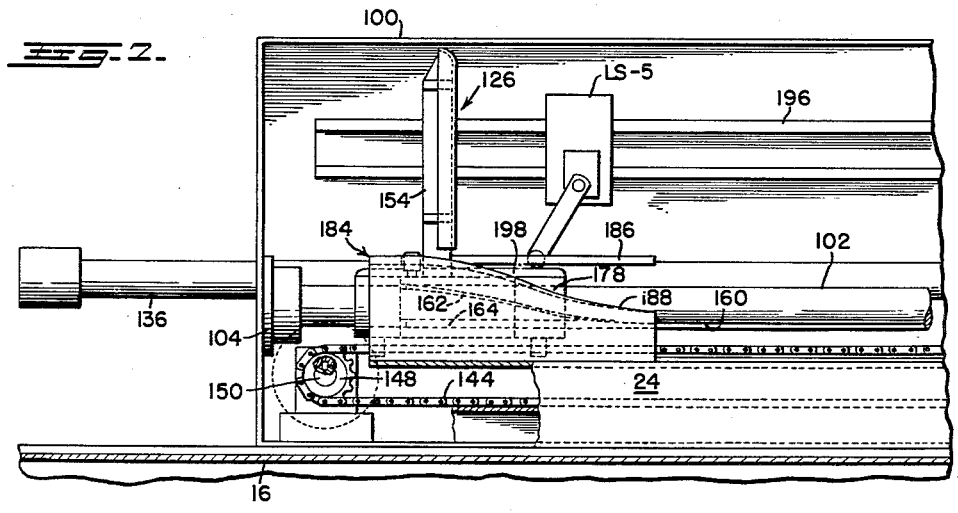
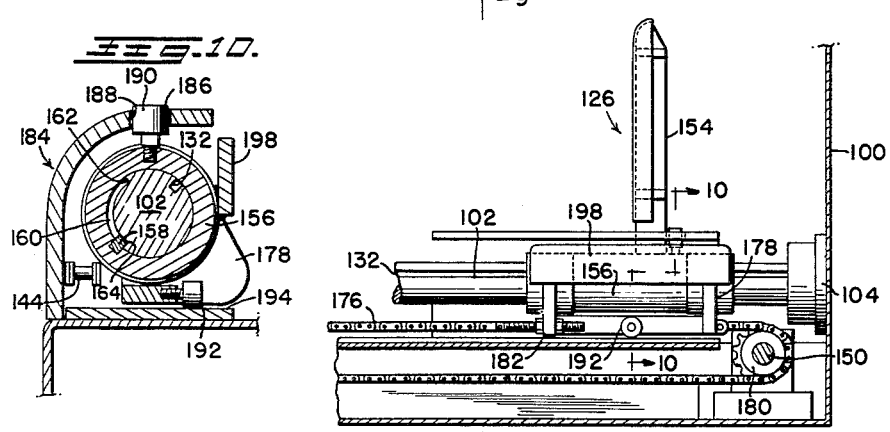
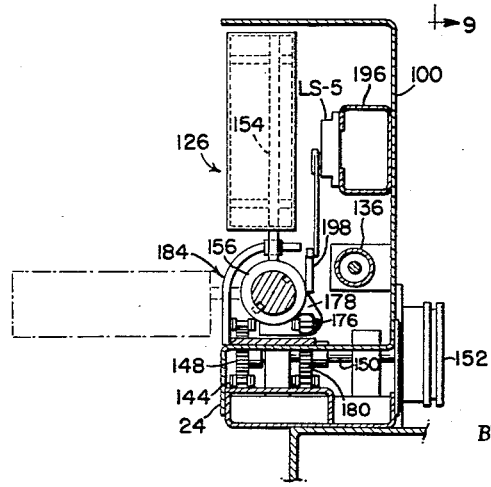
INVENTOR
WARREN S. RAYNOR
ATTORNEY

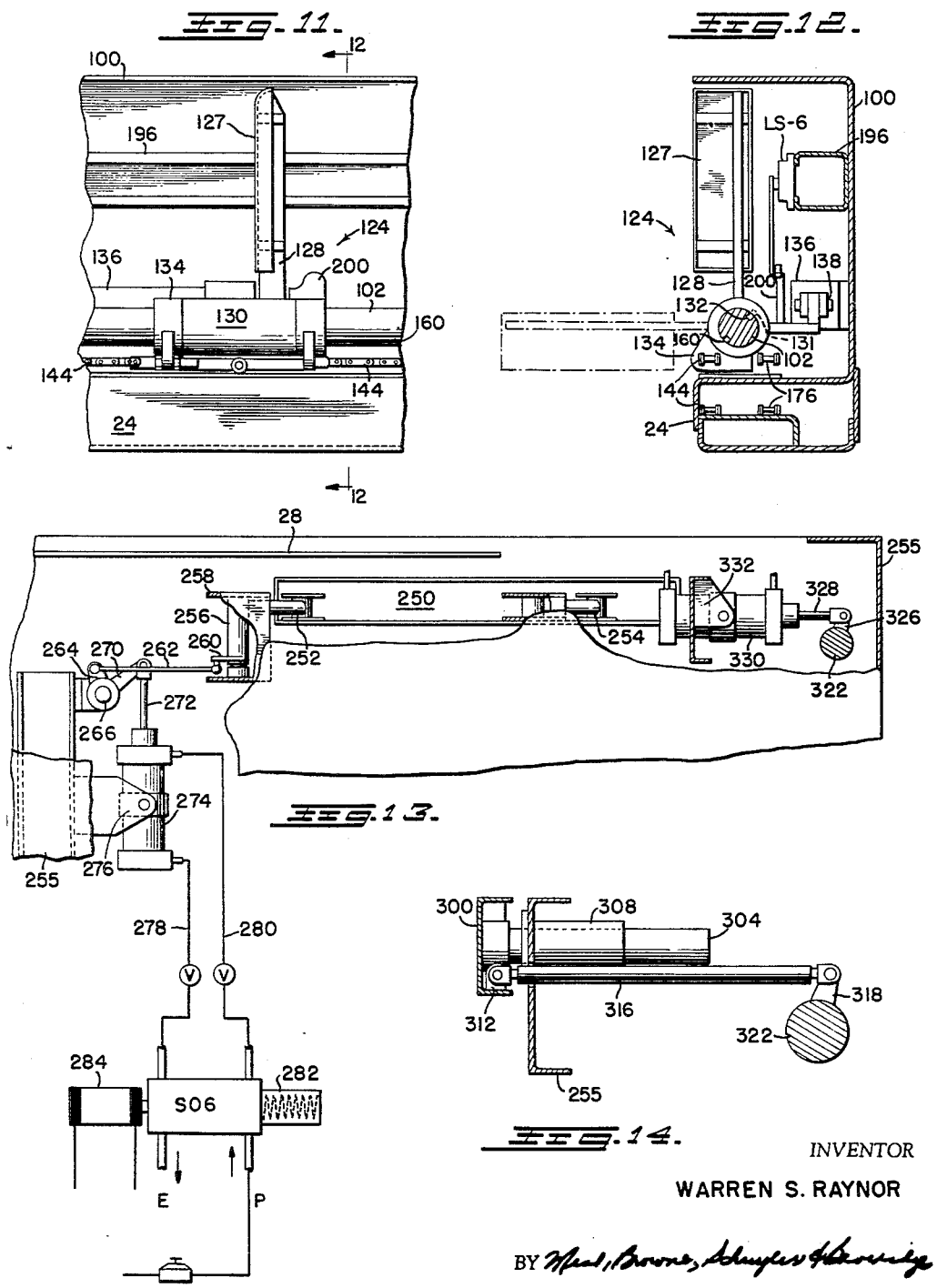

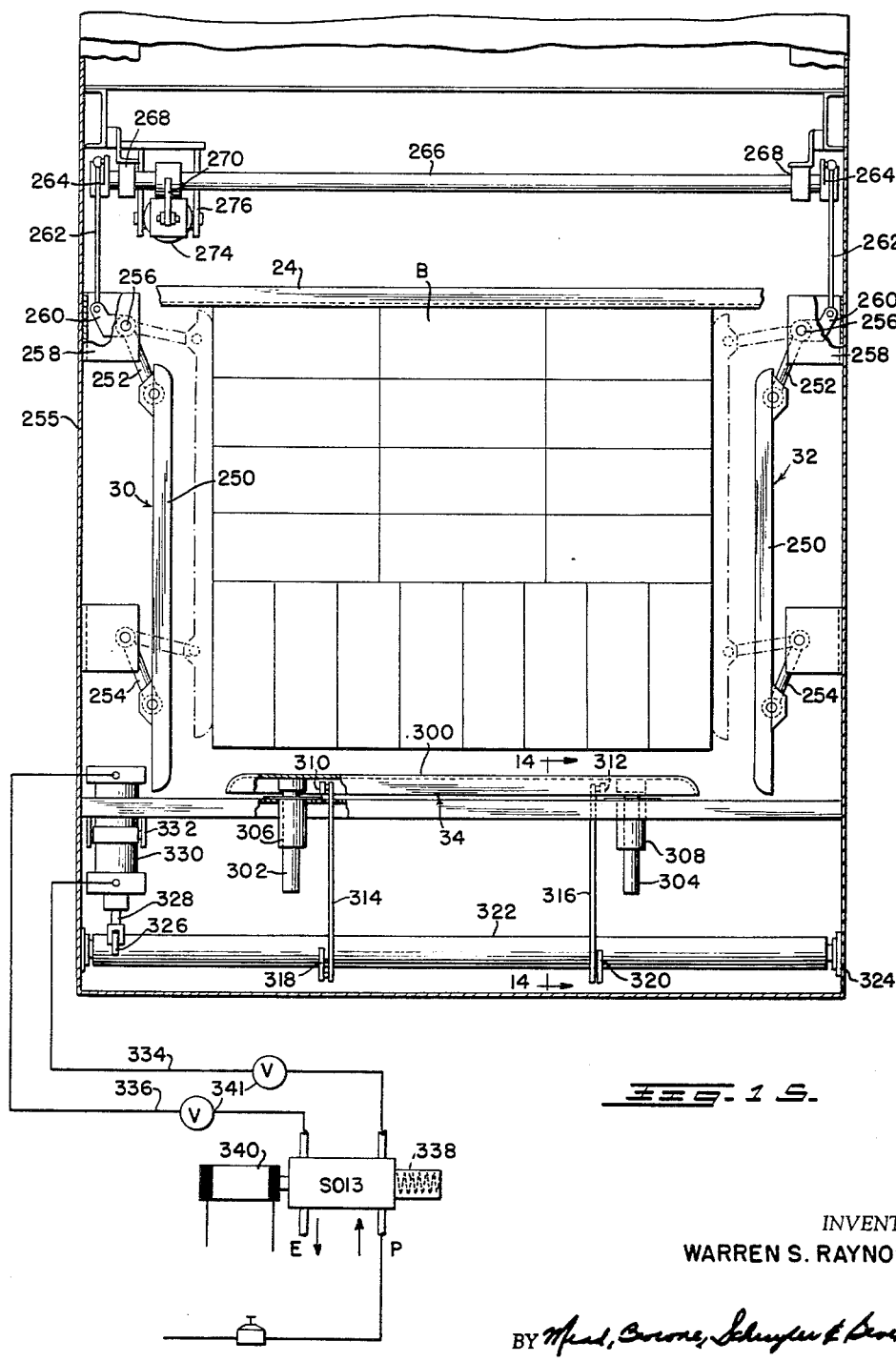

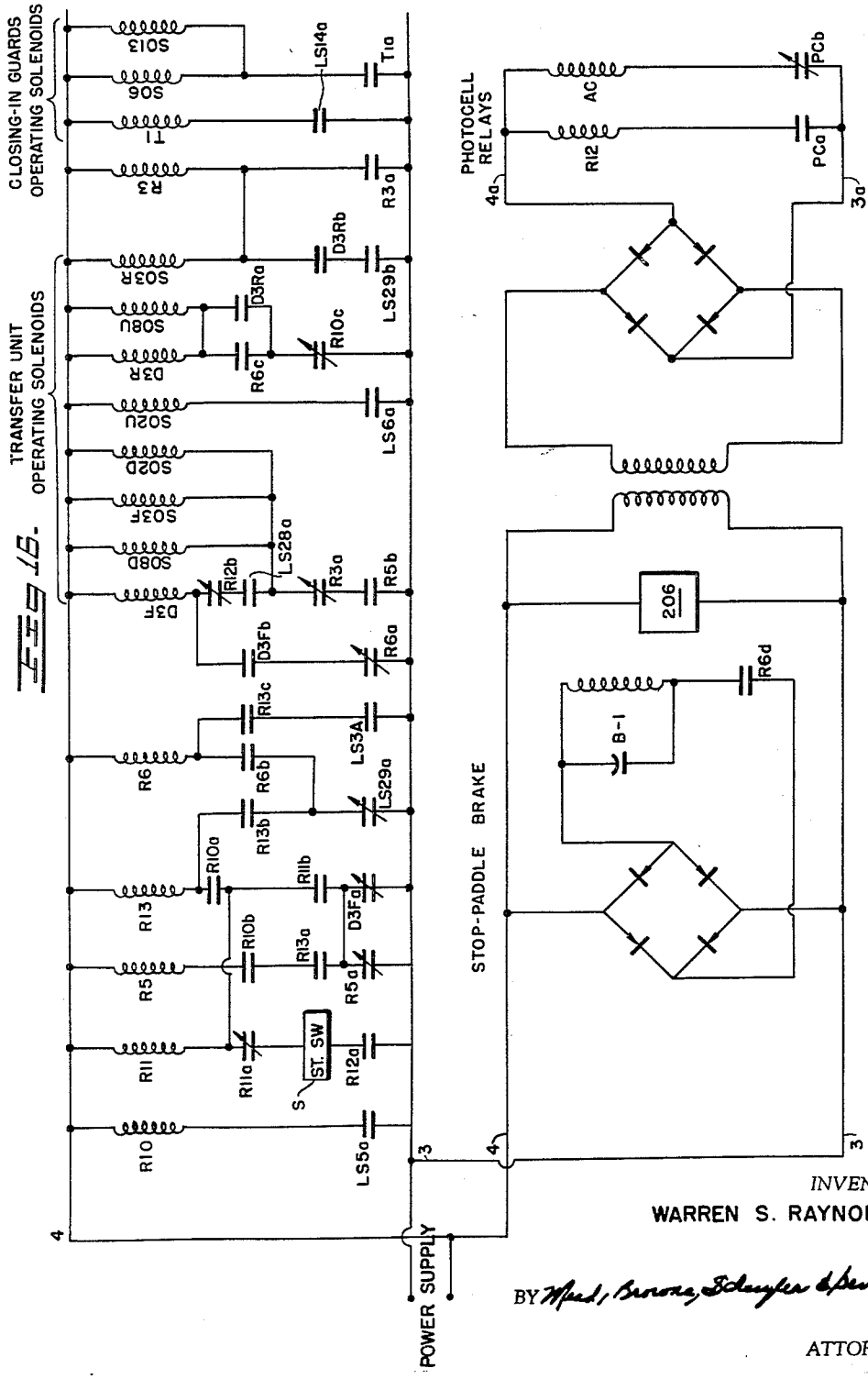

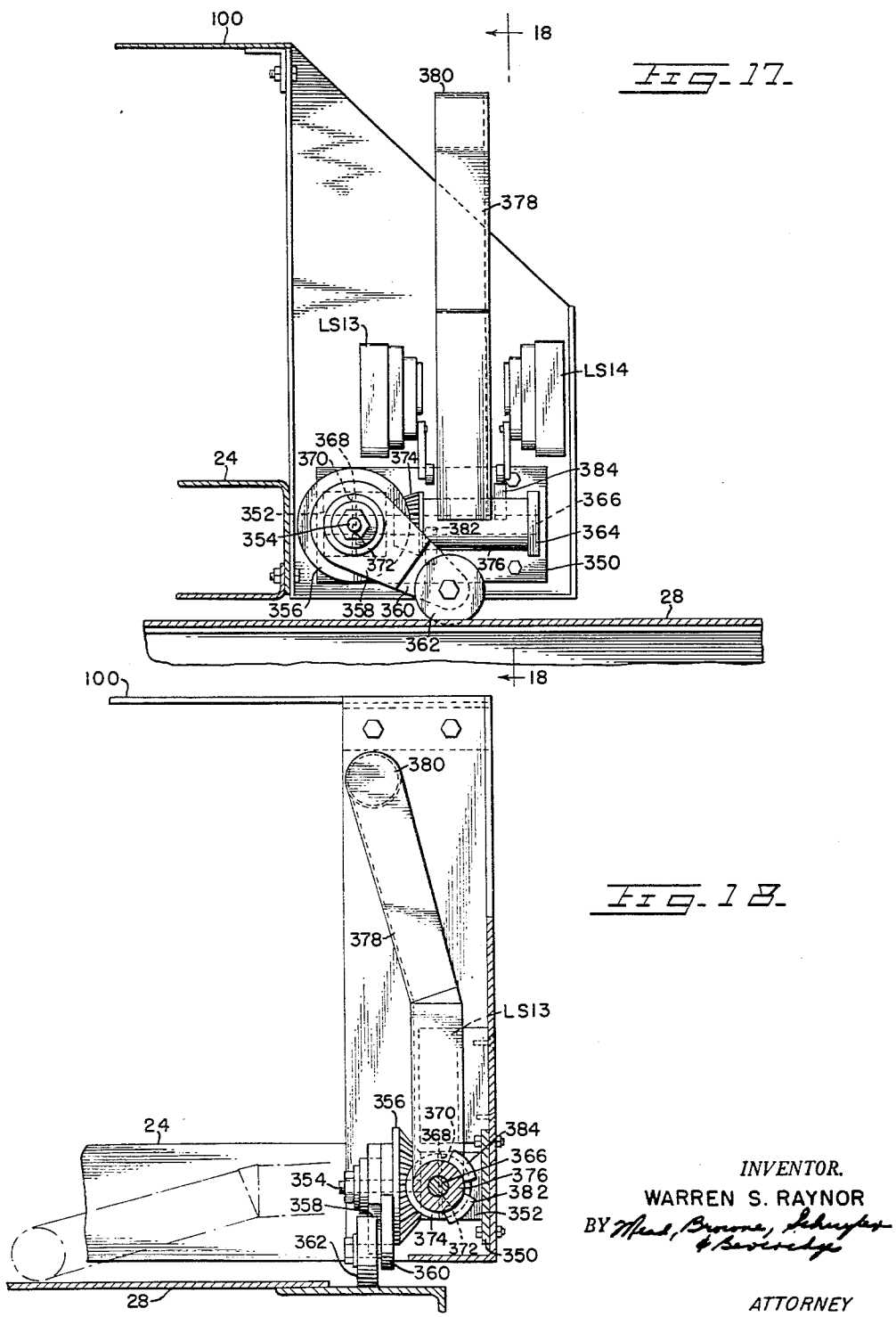

United States Patent Office 2,942,717
Patented June 28, 1960

2,942,717

PALLET LOADING MACHINE

Warren S. Raynor, Port Hope, Ontario, Canada, assignor to Mathews Conveyer Company, Elwood City, Pa., a corporation of Pennsylvania Filed Aug. 20, 1956, Ser. No. 605,025

4 Claims. (Cl. 198—21)

This invention relates to machines for assembling articles from a conveyer line into predetermined arrangements in a unit load. More particularly, the invention is directed to apparatus for transferring articles from a conveyer line onto a pallet in such a manner that the articles are located upon the pallet in a compact, centered, stable condition.

The present invention constitutes an improvement upon the pallet loading machine disclosed in my copending application Serial No. 469,274, filed on November 16, 1954, and is specifically related to the structure employed to assemble the articles into groups and to locate the groups of articles upon the pallet.

A major object of my invention is therefore to provide mechanism for assembling articles into layers of different predetermined patterns to achieve stable arrangements of tiers upon a pallet.

Another object of my invention is to provide improved mechanism for compacting and centering the articles upon the pallet in order to provide a more stable arrangement of articles thereon.

Still another object of my invention is to provide mechanism for initially assembling and compacting rows of articles from a conveyer and transferring the rows onto an apron in order that the articles may be placed upon the pallet in compacted condition even though the rows within a layer of articles are of varying length.

Still another object of my invention is to provide improved mechanism for sensing and counting articles being handled by the pallet loading machine.

In the attainment of the foregoing, and other objects, an important feature of the invention resides in the employment of an article transfer unit which includes a pair of paddles respectively actuable into engagement with the leading and trailing end of a row of articles. The two paddles grip the row of articles between them and, by driving the rearwardmost paddle, the row of articles is transferred from the conveyer to an article receiving apron in compacted arrangement. The paddle in engagement with the leading end of the row of articles may be halted by a brake assembly at any of a number of predetermined locations with respect to an article receiving apron, thus locating the row of articles upon the apron. Because of the engagement of the paddles with each individual row, and the flexibility of location of the row provided by the stop paddle, compacted layers made up of staggered rows may be achieved, or a row may be composed of two or more spaced sections.

Another important feature of my invention resides in the employment of a photocell unit in which the cell energizing beam of light is directed across the conveying surface at an acute angle to the path of articles being conveyed. This arrangement affords several important advantages. First, the angled disposition of the beam of light allows the beam to be broken at a point upstream of the conveying line from the point at which the beam is cleared by an article. By this arrangement, certain operations may be performed in anticipation of the arrival of an article at a given point; other operations may be delayed until the article has cleared the beam, thus assuring that the article is at a different location. Further, when cartons are handled in pairs, pairs of cartons which are operated upon by a carton turning device to dispose the cartons transversely across the conveyer, the cartons sometimes tend to separate out. Were the beam of light directed straight across the conveying surface, the resulting gap between different cartons in the pair would cause the photocell to register a false count.

Still a further feature of my invention resides in an improved arrangement of closing in guards for compacting and centering the cartons upon the pallet. Opposed side closing in guards are mechanically linked to operate simultaneously to compact the cartons in one direction while a single front closing in guard acts to center and compact the cartons in a direction transverse to the action of the side closing in guards. Operation of the front closing in guard is delayed until after the side closing in guards have gripped the layer of articles. The stroke of the front closing in guard is limited so that movement of the row of cartons most distant from this guard does not take place.

Other objects, features and advantages of the invention may be best appreciated by reference to the following detailed description taken in conjunction with the accompanying drawings.

In the drawings:

Fig. 2 is a partial side view taken on line 2—2 of Fig. 1;

Fig. 3 is an enlarged offset sectional view taken on the line 3—3 of Fig. 1;

Fig. 4 is a detail plan view of the transfer unit taken partially in section;

Fig. 5 is an end view of the transfer assembly shown in Fig. 4;

Fig. 6 is a cross sectional view taken on the line 6—6 of Fig. 4;

Fig. 7 is a detail side view, partially in section, of the pusher paddle assembly;

Fig. 8 is a detail view of the pusher paddle assembly shown in Fig. 7 taken from the opposite side of the pusher paddle;

Fig. 9 is a cross sectional view of the pusher paddle assembly taken on the line 9—9 of Fig. 8;

Fig. 10 is another cross sectional view of the pusher paddle assembly taken on the line 10—10 of Fig. 8;

Fig. 11 is a detail side view of the stop paddle assembly;

Fig. 12 is a cross sectional view of the stop paddle assembly taken on the line 12—12 of Fig. 11;

Fig. 13 is an end view, partially in section, of the closing in guard assembly taken from the left-hand side of Fig. 15;

Fig. 14 is a cross sectional view of the front closing in guard assembly taken on the line 14—14 of Fig. 15;

Fig. 15 is a plan view, with certain parts broken away and others shown partially in section, of the closing in guard assembly;

Fig. 16 is a schematic diagram of an electrical circuit employed to control the transfer unit and closing in guard assembly;

Fig. 17 is a front view of the full lift control assembly; and

Fig. 18 is a cross sectional view taken on line 18—18 of Fig. 17.

*General description*

Figure 1:
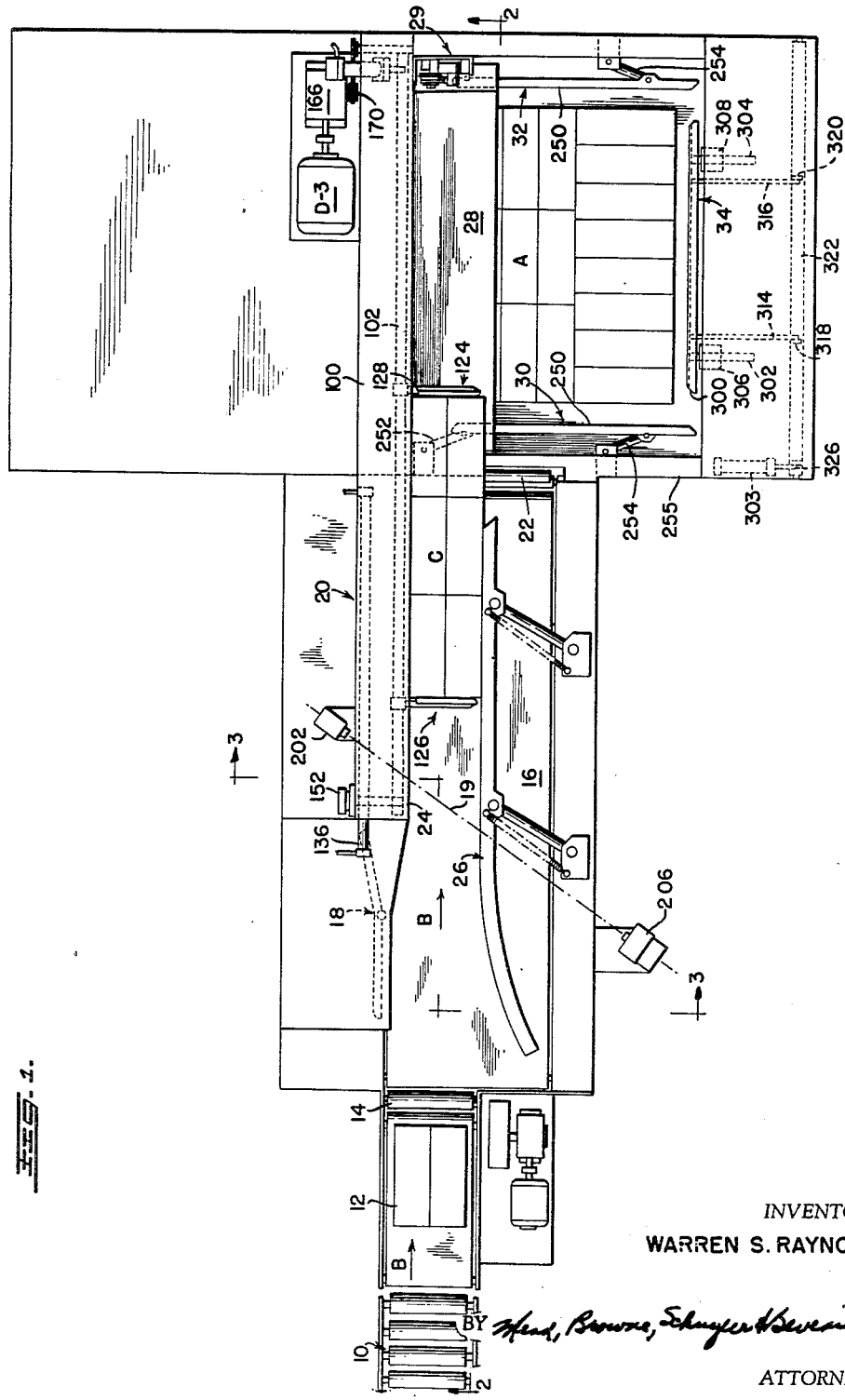
Fig. 1 is an over-all plan view of a pallet loading machine incorporating my invention.

The present invention is especially adapted for employment in a pallet loading machine of the general type disclosed in my copending application Serial No. 469,-

274, filed on November 16, 1954. These machines are employed to receive articles from a conveyer line, to automatically assemble the articles into groups in predetermined patterns, load the articles by groups in tiers upon a pallet, to supply empty pallets for loading, and to automatically discharge the pallets when fully loaded with articles.

One embodiment of such a machine is illustrated in Figs. 1 and 2 and may comprise a gravity conveyer 10 adapted to convey articles to a metering conveyer assembly 12 located at the entry of the pallet loading machine. Metering of cartons entering the pallet loading machine is accomplished by conveyer assembly 12 and an acceleration roller 14 located at the discharge end of metering conveyer 12. Cartons moving beyond acceleration roller 14 are conveyed by an infeed conveyer assembly 16 to a position where they may be acted upon by a carton turning device indicated generally at 18 which may be selectively actuated to turn conveyed articles through an angle of 90 degrees. Details of the metering belt 12 and carton turning device 18 form no part of the instant invention, but are more fully described and claimed in my copending application Serial No. 469,274. After conveyed articles have passed the carton turning device 18, infeed conveyer 16 conducts the cartons to a position alongside a transfer unit generally indicated by the numeral 20. A carton counting device 19, described in greater detail below, counts cartons passing between turning device 18 and transfer unit 20 and is connected into an electrical control circuit to operate the transfer unit after a predetermined number of cartons have actuated the counting device. Cartons are accumulated at the discharge end of infeed conveyer 16 by a normally raised carton stop 22. Cartons being conveyed by infeed conveyer 16 are guided into abutment with a side frame member 24, extending along the open side of transfer unit 20, by a spring loaded guide 26.

After the accumulation of a predetermined number of cartons at carton stop 22, the cartons are transferred as a group by transfer unit 20 beyond stop 22 to an apron 28 which is mounted for movement transversely across the path of articles conveyed. Transfer unit 20 locates the group of articles upon apron 28 and is returned to its rest position to act upon a subsequent group of articles. Apron 28 is indexed, by mechanism such as that described in my copending application Serial No. 469,274, so that the next subsequent group of articles may be located upon the apron closely adjacent one side of the previously transferred group of articles. When a predetermined number of groups of articles have been located upon the apron, the apron is retracted from beneath the articles and the articles are stripped from apron 28 by side wall 24 to dispose the articles upon a pallet located beneath the apron. The pallet is positioned at various levels within a lift shaft by a suitably controlled lift so that its upper surface supports the tier of cartons indicated at A in Fig. 1.

When the first tier of cartons is disposed upon the pallet, the pallet is lowered, by the lift, to dispose the upper surface of the tier of cartons in the horizontal plane previously occupied by the upper surface of the pallet. The lift is stopped at the desired elevation by a control circuit actuated by full lift control assembly 29, normally located clear of the cartons, which follows the cartons as they are lowered by the lift, stops the lift at the desired level and actuates side closing in guards 30 and 32 and front closing in guard 34 to compact and center the cartons upon the pallet.

Subsequent groups of articles are accumulated, transferred to the indexing apron and placed upon the previous tier of articles upon the pallet in the same manner as described above.

When the pallet is fully loaded, the loaded pallet is discharged to a discharge conveyer and conveyed to a point where it may be handled by a fork lift truck. At the same time the fully loaded pallet is being discharged, an empty pallet is removed from a stack and placed into position where it may be loaded in the same manner. A suitable pallet handling mechanism is described in detail in my copending application Serial No. 469,274.

*Transfer unit*

The structural details of transfer unit 20 are illustrated in Figs. 2 through 12 of the drawings. Referring first to Fig. 4, transfer unit 20 includes a hood-like frame 100 having an open side located above side plate 24 along which articles are handled and extending from a position intermediate the ends of infeed conveyer 16 to a location beyond apron 28. Main shaft 102 extends the entire length of frame 100 and is journaled into the end walls of the frame at 104 and 106 for free rotation with respect to frame 100. Shaft 102 is rotatably positioned by an expansible chamber motor 108 having a piston rod 110 pivotably connected to crank arm 112 fixed to shaft 102 as by collar 114. In order to compensate for the rotary path of crank 112, motor 108 is pivotally supported between brackets 116—118 secured to frame 100. Limit switches LS28 and LS29 (see Fig. 5) are mounted upon frame 100 and have strikers which are adapted to be engaged by crank 112 to sense the rotative position of shaft 102.

Motor 108 acts to position shaft 102 in either of two positions, depending upon which side of the piston within motor 108 is connected to pressure line P (see Fig. 5). Admission of pressure to either of lines 120 or 122 is controlled by a four-way reversing valve SO8 which acts to connect one of lines 120 and 122 to pressure line P while simultaneously connecting the other of lines 120 and 122 to exhaust line E. With the connections as illustrated in Fig. 5, pressure is admitted to the lower or left side of the piston while the opposite side of the piston is connected through line 120 to exhaust line E. In this situation, the piston is at its rightward-most end of travel and crank 112 is disposed in the vertical or 12:00 o'clock position. When the connections of solenoid valve SO8 are reversed, line 122 is connected to the exhaust line and line 120 is connected to the pressure line P. This causes piston rod 110 to move to the left as viewed in Fig. 5 and to rotate crank 112 through a 90° angle to a horizontal or 9:00 o'clock position. Since crank 112 is fixedly coupled to main shaft 102, the main shaft is rotated with crank 112.

The carton engaging parts of transfer unit 20 consist of a stop paddle assembly 124 and a pusher paddle assembly 126. Stop paddle 124 assembly includes a paddle 127 mounted upon an arm 128 fixed to and extending from a sleeve 130 mounted upon main shaft 102. Sleeve 130 is permitted to move axially of main shaft 102, but relative rotation between shaft 102 and sleeve 130 is prevented by engagement of a key 131 (Fig. 12) projecting radially inward from the inner surface of sleeve 130 into a longitudinally extending keyway 132 on shaft 102. Longitudinal movement of sleeve 130 along shaft 102 is accomplished by a yoke assembly 134 slidably surrounding shaft 102 and engaging sleeve 130 at either end. Yoke 134 is not keyed or coupled to shaft 102 and therefore shaft 102 may rotate relative to yoke 134. Yoke 134 is "driven" in longitudinal movement by an expansible chamber motor 136 connected to yoke 134 as at 138.

The respective sides of the piston of motor 136 are hydraulically connected by lines 140 and 142 to a four-way reversing valve SO3 which selectively connects lines 140 and 142 to pressure and exhaust lines E and P to drive the motor piston. Line 140 includes a pressure regulator PR which reduces the pressure applied to the left side of the piston of motor 136 as shown in Fig. 4. The actual pressure supplied through the pressure regulator is adjusted to a pressure which is just insufficient to move stop paddle assembly 124 to the right (Figs. 1, 2 or 4). Movement of the stop paddle assembly to the right is actually accomplished by the force exerted by pusher paddle assembly 126 through the assembled cartons. This is to assure that stop paddle 127 is maintained in engagement with the leading end of the group of articles in order to stop the group at the desired location upon apron 28. This action takes place only during the forward stroke of the piston, pressure applied to return the piston being of a magnitude sufficient to drive stop paddle assembly 124.

Stop paddle assembly 124 is halted at the desired location by a chain 144 connected to the forward (rightwardmost in Fig. 4) arm of yoke 134, extended around a sprocket 146 mounted for free rotation upon shaft 168 (right-hand end of frame 100 in Fig. 4) and returned to the other end of yoke 134 via sprocket 148 keyed to brake shaft 150 at the leftward end of frame 100 in Fig. 4. Shaft 150 is journaled for rotation in frame 100 and projects through the frame into operative relationship with a brake assembly 152 mounted upon the rear wall of frame 100. Actuation of brake 152 immediately halts stop paddle assembly 124 since the pressure supplied through pressure regulator PR is insufficient to overcome the braking force exerted on shaft 150 and transmitted to stop paddle assembly 124 by means of chain 144. Actuation of brake assembly 152 is controlled by engagement of stop paddle assembly 124 with suitably located limit switches such as LS3 and LS3'.

Pusher paddle 153, like stop paddle 127, is mounted at the end of an arm 154 secured to and extending from sleeve 156 mounted upon main shaft 102. Like sleeve 130, sleeve 156 has an inwardly extending key 158 (see Fig. 10) which is engaged in a keyway 160 cut into shaft 102. At the leftwardmost end (Fig. 7) of shaft 102, keyway 160 is enlarged by cutting one side wall 162 to conform to a spiral or helical path, while extending the other wall 164 in a true axial direction. Sleeve 156 is adapted for axial movement on shaft 102 and, when the sleeve is at its leftwardmost position, relative rotation is permitted between shaft 102 and sleeve 156 by an amount dependent upon the angular displacement of walls 162 and 164 of keyway 160. Thus, as best seen in Fig. 10, when pusher paddle assembly 126 is in its inoperative or rest position (that of Fig. 7) shaft 102 may rotate approximately 90° in a counterclockwise direction before wall 162 of keyway 160 comes into contact with key 158 on sleeve 156.

Pusher paddle assembly 126 is driven in longitudinal movement along shaft 102 by drive motor D-3 which acts through a reducer drive unit 166 to drive shaft 168 by means of a suitable chain and sprocket arrangement indicated generally at 170. Shaft 168 is rotatably supported upon frame 100 as by bearing assemblies 172. A sprocket 174 is keyed to shaft 168 and engages a chain 176. Chain 176 is attached to one arm of a yoke 178, similar in construction to yoke 134, and is extended from yoke 178 around a sprocket 180 freely mounted upon brake shaft 150, sprocket 174 and returned to the other arm of yoke 178 to which it may be secured by means of an adjustable connection 182 (see Fig. 8).

Because of the enlargement at the leftwardmost (Fig. 7) end of keyway 160, it is desirable to provide a fixed housing 184 upon frame 100 adjacent the rest position of pusher paddle assembly 126 in order to assure that pusher paddle 153 is maintained in the proper position during the time that key 158 is located in the enlarged portion of keyway 160. As best seen in Figs. 4 and 7, housing 184 has an elongated opening defined by a straight, axially extending side 186 and a spiral or helically extending side 188. A roller 190 is mounted upon sleeve 156 in a position in which it may engage either of the sides 186 or 188. As will be noted in Fig. 7, the orientation of the straight or axial edge 186 and spiral edge 188 is reversed from the respective straight and helical edges 164 and 162 of keyway 160.

In the initial or rest position pusher paddle assembly 126 is as shown in Figs. 7 and 10 of the drawings. Pusher paddle 153 is at its leftwardmost end of travel (Fig. 7) and is disposed in a vertical position out of the path of cartons traveling on infeed conveyor 16 with main shaft 102 in its extreme clockwise (Fig. 10) position and key 158 is in abutment with the straight or axially extending edge 164 of keyway 160. In the sequence of operations main shaft 102 is first rotated 90° in a counterclockwise direction as viewed in Fig. 10. Because key 158 is in the enlarged portion of keyway 160, no rotation is imparted to pusher paddle 153 at this time and in fact any tendency of pusher paddle 153 to rotate with shaft 102 would be prevented by the abutment between roller 190 and the leftwardmost end of edge 188. The 90° rotation of shaft 102 brings wall 162 of keyway 160 into abutment with key 158. Drive motor D3 then acts to move pusher paddle assembly 126 axially of shaft 102 (to the right as viewed in Fig. 7) and the engagement of wall 162 with key 158 begins to rotate pusher paddle 153 counterclockwise as viewed in Figs. 9 and 10 toward the hidden line position illustrated in Fig. 9. This counterclockwise movement of pusher paddle 153 would be uncontrolled were it not for the engagement between roller 190 and edge 188 of housing 184. The helical configuration of edge 188 and wall 162 is such that a new "key and keyway" is defined wherein the opposite sides of the "keyway" are respectively defined by wall 162 and edge 188 and the "key" is represented by the engagement therewith of key 158 and roller 190.

After pusher paddle assembly 126 has travelled to the rightwardmost end of its stroke, drive motor D3 is reversed and main shaft 102 is rotated clockwise as viewed in Fig. 10. Since key 158 is at this time engaged in a narrow portion of keyway 160, pusher paddle 153 is rotated upwardly with the rotation of shaft 102. As the pusher paddle assembly 126 approaches the end of its return stroke and the enlarged portion of keyway 160, roller 190 is engaged with edge 186 of housing 184, thus maintaining key 158 in engagement with wall 164 of keyway 160 as key 158 traverses the enlarged portion of keyway 160.

It will be noted from Fig. 9 that chain 176 is secured to yoke 178 at an offset position which would tend to cause rotation of sleeve 156 about shaft 102 in a clockwise direction due to the weight of the chain acting upon yoke 178. To prevent this rotation, a roller 192 (Fig. 10) is mounted upon yoke 178 for constant engagement with surface 194 on frame 100.

To sense the axial positions of stop paddle assembly 124 and pusher paddle assembly 126 and to initiate various sequences of the control cycle, a plurality of limit switches LS5, LS6, LS3 and LS3' (Fig. 2) are mounted upon a bracket 196 secured to frame 100. Limit switches LS5 and LS6 are provided with depending strikers which are aligned to engage contact cam 198 secured to yoke 178 of pusher paddle assembly 126. Limit switches LS3 and LS3' have depending strikers which are located to engage contact cam 200 (Fig. 4) fixedly mounted upon yoke 134 of stop paddle assembly 124. In order that the striker of limit switch LS6 will not be engaged by contact cam 200 of stop paddle assembly 124, the respective strikers and contact cams are offset from each other so that the striker of limit switch LS6 does not lie in the path traversed by contact cam 200.

Carton counter

Initial actuation of transfer unit 20 is accomplished by carton counter 19 which includes a light source 202 mounted at the rear of the transfer unit and disposed to project a beam of light through hole 204 in side wall 24 and across infeed conveyor 16 at an acute angle to the path of cartons or articles being handled on conveyer 16. Photocell unit 206 is mounted at the opposite side of conveyer 16 and is illuminated by light source 202 whenever the beam is not broken by articles passing along conveyer 16.

This photocell is employed to count cartons or pairs of cartons being handled by infeed conveyer 16 and is connected in circuit (Fig. 16) with a stepping switch S which, after a predetermined number of cartons have broken the light beam, acts to initiate the operation of transfer unit 20.

Angular disposition of the light beam with respect to the path of articles being handled on infeed conveyer 16 enables the single photocell unit 206 to sense the arrival of articles at two separated locations upon conveyer 16; i.e. the position at which the beam is first broken and the position at which the beam is finally cleared. Several important operational advantages flow from this arrangement.

Specifically, the angling of the beam allows the beam to be broken when the article is at a substantial distance upstream from the transfer unit. This allows certain operations to be performed while the article is still moving into position.

Pusher paddle assembly 126 must be actuated only at a time when the final article of a group is located at a position on conveyer 16 where pusher paddle 153 will be lowered behind the article or carton rather than in front or on top of the carton. By actuating pusher paddle 153 upon the clearing of the beam by the trailing corner of the article adjacent side wall 24, the actuation is delayed until the carton reaches a location a substantial distance downstream from the point where the beam was originally broken by the leading corner of the article at the opposite side of the conveyer.

Further, when cartons are handled in pairs, those cartons which are turned by turning device 18 tend to separate as they are conveyed to the transfer unit. The angular beam does not register the gap between these cartons while a beam passing normally across the conveyer would.

*Closing in guards*

Closing in guards 30, 32 and 34 are mounted upon machine frame 255 for operation in a plane immediately beneath apron 28 (note Figs. 2 and 13), apron 28 lying in the same general horizontal plane as the conveying surface of infeed conveyer 16. As best appreciated from Fig. 2, the closing in guards are located near the top of a lift in which the pallet to be loaded is handled. The purpose of closing in guards 30, 32 and 34 is to compact and center the tiers of cartons upon the pallet.

Referring to Fig. 15, side closing in guard assemblies 30 and 32 are similar to each other and each include a bumper-like carton engaging element 250 pivotally mounted on the outer end of links 252 and 254 which in turn are pivotally supported on frame 255 for rotation in a horizontal plane. The pivotal support for the link 252 takes the form of a vertical shaft 256 (Fig. 13) fixedly secured to the link 252 and journaled for rotation in bracket 258 fixed to frame 255. An integral crank 260 is mounted upon shaft 256 and is connected by link 262 to a crank 264 fixed upon the respective ends of shaft 266. Shaft 266 is rotatably mounted on frame 255 as at 268 and provides a common connection between the respective side closing in guard assemblies 30 and 32 for simultaneous actuation thereof. Shaft 266 is rotated by crank 270 fixedly secured to shaft 266 and pivotally connected at its outer end to piston rod 272 of expansible chamber motor 274. Motor 274 is pivotally supported upon the machine frame as at 276 (Fig. 13) to accommodate for the rotary path of crank 270. The respective sides of the piston of motor 274 are connected by lines 278, 280 to pressure and exhaust lines P and E respectively through a four-way reversing valve SO6. Valve SO6 is normally biased to a position wherein pressure is admitted to motor 274 through line 278 by spring 282 to drive piston rod 272 to its uppermost position, thereby establishing the normal position of closing in guards 30 and 32 in their retracted or full line position as shown in Fig. 15. Energization of solenoid coil 284 reverses the connections of reversing valve SO6 to cause piston rod 272 to stroke downwardly as viewed in Fig. 13 and thus drive the elements 250 to their carton engaging (hidden line position) of Fig. 15.

Because of the stripping action of side wall 24 during the retraction of apron 28, the uppermost edge of the carton assembly (edge B in Fig. 15) is squared up and aligned in a satisfactory manner. For this reason, only a single front closing in guard 34 need be employed to compact and square up the cartons in the direction transverse to the action of side closing in guard assemblies 30 and 32.

Front closing in guard assembly 34 includes a bumper-like carton engaging element 300 having a pair of rearwardly projecting guide rods 302 and 304 which are slidably supported in elongated journal assemblies 306 and 308 mounted on frame 255. Upstanding lugs 310, 312 form a pivotal support for one end of a link 314, 316 which connects carton engaging element 300 to cranks 318, 320 integral with shaft 322 journaled for rotation in frame 255 at 322, 324.

A third crank 326 is secured upon shaft 322 and is pivotally connected to the outer end of a piston rod 328 of expansible chamber motor 330. Motor 330 is pivotally supported upon the machine frame as at 332 to compensate for vertical displacement of piston rod 328 occasioned by rotation of crank 326. The respective sides of the piston within motor 330 are connected by lines 334, 336 to pressure and exhaust lines, P and E, respectively through a four-way reversing valve SO13. Spring 338 is employed to normally establish the connections of valve SO13 to connect line 334 to the pressure line P, thereby locating piston rod 328 in its outermost position to retract element 300 into the position shown in Fig. 15. Energization of solenoid coil 340 reverses the connection of valve SO13 to cause piston rod 328 to stroke in, thereby rotating shaft 332 clockwise as viewed in Fig. 13 and driving element 300, by links 314 and 316, into engagement with the cartons.

The closing in guard assemblies are actuated in conjunction with the movement of the lift, indicated generally at 320 in Fig. 2. Generally speaking, the lift may comprise a platform-like framework 322 having a plurality of channel-like guide elements 324 for locating a pallet 326 upon the lift. The lift is raised and lowered by chains 328 which may be driven by any conventional motor means (not shown).

Control of the lift and closing in guard assemblies is accomplished by tracking arm assembly 29 mounted upon frame 255 at the downstream edge of apron 28 closely adjacent side frame member 24 (note Fig. 1). Details of the full lift control assembly are best appreciated from an inspection of Figs. 17 and 18.

Assembly 29 includes a frame generally indicated by numeral 350 which is secured to the upper surface of frame 255 adjacent side member 24. A block 352 is fixed to frame 50 and serves to support a projecting stud 354 which overlies the edge of apron 28. Bevel gear 356 is rotatably mounted upon stud 354 and has an arm 358 secured to its outer face by any suitable means such as welding. The outer end of arm 358 is formed with an offset portion 360 upon which is rotatably supported a roller 362 which is normally in contact with the upper surface of apron 28 closely adjacent the downstream edge.

A bracket member 364 is mounted upon frame 350 at a location where a shaft or spindle 366 may be cooperatively supported by bracket 364 and block 352 at right angles to stud 354. Shaft 366 may be secured in position by any suitable means such as a pin 368 extending through a bore 370 in block 352 and engageable in a bore 372 formed in shaft 366.

Rotatably mounted upon shaft 366 is a second bevel gear 374 having an elongated hub portion 376 extending from bevel gear 374 to bracket 364. The location of shaft 366 with respect to stud 354 is such that bevel gear 374 and bevel gear 356 are in mesh.

Secured, as by welding, to hub portion 376 is tracking arm 378. Arm 378 is of a length sufficient to enable its end portion to extend into the lift shaft when in the hidden line position shown in Fig. 18. The end portion of arm 378 is offset and has a cylindrical weighted element 380 fixedly secured at its distal end. A pair of limit switch engaging cams 382 and 384 are also fixedly mounted upon hub portion 376 at a position where they may engage the strikers of limit switches LS13 and LS14 which are fixedly mounted upon frame 350.

When full lift control assembly 29 is in its rest position, roller 362 rests upon apron 28 and the meshed bevel gears 356 and 374 hold tracking arm 378 in its upright rest position. When apron 28 is retracted beneath side frame 24, roller 362 is no longer supported, and the offset location of the weighted member 380 causes arm 378 to fall under the influence of gravity down onto the upper surface of the cartons upon the lift. As the lift lowers, tracking arm 378 remains in engagement with the upper surface of the cartons and follows them down the lift shaft due to the force of gravity acting upon arm 378. The engagement of cams 382 and 384 with the respective strikers of limit switches LS13 and LS14 is related to the movement of arm 378 in such a manner that further lowering of the lift is halted and actuation of the closing in guards initiated by appropriate action of the two mentioned limit switches when the upper surface of the carton reaches a predetermined level in the lift shaft.

Limit switches LS13 and LS14 are connected in appropriate circuits in such a manner that limit switch LS13 is out of engagement with cam 382 and open whenever roller 362 is supported upon apron 28. As apron 28 moves out from beneath roller 362, cam 382 contacts the striker of limit switch LS13 to close the contacts of the switch and thereby initiate the actuation of the lift lowering motor. LS13 remains closed until the cartons reach the desired level within the lift, at which time cam 382 moves out from beneath the striker of limit switch LS13, thus opening the contacts and ceasing operation of the lift operating motor.

At this time, the striker of limit switch LS14 is first engaged by its cam 384 and limit switch LS14 is closed to close contacts LS14a to initiate actuation of the closing in guard assemblies. Suitable lockout relays are employed to retain the respective circuits in open position upon raising of tracking arm 378 during the ensuing movement of apron 28 outwardly over the lift shaft.

Details of a suitable lift operating arrangement together with a somewhat different means for sensing the position of the pallet within the lift shaft, are disclosed and described in detail in my copending application Serial No. 469,274.

*Operation*

The pallet loading machine disclosed in this application is adapted to handle cartons advanced onto infeed conveyer 16 either singly or in pairs. Since certain additional problems are involved in the handling of cartons by pairs, the following description will assume that the cartons are to be handled by pairs, however, it is to be understood that the machine is equally well adapted to handle cartons singly.

As initial condition, it will be assumed that no cartons have reached the pallet loading machine. Apron 28 is indexed out over the elevator shaft to the position shown in Fig. 1. A pallet is located in the elevator shaft at the position occupied by the tier of cartons A shown in Fig. 1 and extends beneath apron 28 to an edge which is located substantially in the same vertical plane as side wall 24. The upper surface of the pallet lies in the horizontal plane containing the upper surfaces of the cartons A in Fig. 2. Transfer unit 20 is conditioned with the parts in the positions shown in Figs. 4 and 7, while closing in guards 30, 32 and 34 are located in their normal retracted position shown in Figs. 1 and 15. Carton stop 22 is disposed in its upper or carton stopping position, light source 202 is illuminated and metering conveyer 12 and infeed conveyer 16 are energized to drive the conveying surfaces in the direction of the arrows B, B in Fig. 1.

Cartons are fed by pairs along gravity conveyer 10 to metering conveyer 12. Normally, the gravity conveyer will be saturated with cartons and the functioning of metering conveyer 12 could be said to be analogous to a brake. Metering conveyer 12 acts to conduct cartons from gravity conveyer 10 at a controlled rate. As the cartons reach acceleration roller 14 at the discharge end of metering conveyer 12, they are accelerated during their transit onto infeed conveyer 16 to space the cartons out. The cartons are advanced to a position adjacent carton turning device 18 which may or may not be actuated at this time to turn the cartons through an angle of 90 degrees. Carton turning device 18 is selectively actuated (see Serial No. 469,274) in accordance with the desired patterns to be placed upon the pallet (note orientation of cartons A in Fig. 1). The cartons, after passing turning device 18, break the beam of light between light source 202 and photocell unit 206. The breaking of the beam actuates stepping switch S, thereby counting the carton pair.

The first pair of cartons is advanced along infeed conveyer 16 until they come into abutment with carton stop 22 which is raised at this time. The cartons are biased against side wall 24 by spring loaded guide 26 during the transit of this portion of infeed conveyer 16. During this time, the second pair of cartons has advanced beyond acceleration roller 14 onto infeed conveyer 16 and is being acted upon, if at all, by carton turning device 18. Subsequent pairs of cartons are transferred onto infeed conveyer 16 until a predetermined number (three pairs as shown in Fig. 1) have been accumulated behind stop 22.

Photocell unit 206 (referring now to the electrical schematic of Fig. 16) includes a relay having two sets of contacts PCa and PCb. When the photocell is illuminated by the light beam, contacts PCb are closed and a circuit is completed across supply lines 3a, 4a through a counting relay AC. Counting relay AC is employed to actuate stepping switch S by moving the stepping switch one step each time the relay is deenergized, i.e. the light beam is broken by a passing pair of cartons. Breaking of the beam opens contacts PCb and closes contacts PCa to complete a circuit across supply lines 3a—4a through relay R12. The stepping switch contacts are so connected that after a predetermined number of pairs of cartons have broken the light beam, the stepping switch closes to complete a circuit across supply lines 3—4 through closed contacts R12a, stepping switch S and normally closed contacts R11a to energize relay R11.

At this time, stepping switch S may also actuate a control circuit (not shown) to momentarily halt metering conveyer 12 during a transfer operation.

Since the striker of limit switch LS5 is engaged at this time with contact cam 198 (pusher paddle assembly), limit switch contacts LS5a are closed and a circuit is completed across supply lines 3 and 4 through contacts LS5a and relay coil R10 closing contacts R10a and therefor relay R13 is energized through contacts R10a simultaneously with relay R11. Energization of relay R11 immediately opens the contacts R11a and simultaneously closes the contacts R11b to lock in relays R11 and R13 through contacts R11b and both of closed contacts R5a and D3Fa. Energization of relay R13 closes contacts R13a, thereby energizing relay R5 through normally closed contacts R5a and D3Fa contacts R13a and contacts R10b (closed upon energization of relay R10).

Energization of relay R5 opens contacts R5a, however, relays R5, R11 and R13 remain locked in through contacts D3Fa. Simultaneous with the opening of contacts R5a, contacts R5b are closed, thus completing a circuit across supply lines 3 and 4 through contacts R5b, normally closed contacts R3a and solenoid coils SO8D, SO3F, and SO2D. (It should be noted that all paired solenoid coils with SO prefixes are of the strap acting type and remain in the position to which they have been last actuated, even though subsequently deenergized, until the opposite solenoid coil is energized.)

Solenoid coil SO8D acts to position four way reversing valve SO8 to cause motor 108 to drive shaft 102 90 degrees in a counterclockwise direction as shown in Fig. 5. Rotation of shaft 102 through this 90 degree angle lowers stop paddle 127 from the position shown in full lines in Fig. 12 to the horizontal carton engaging position indicated in hidden lines in Fig. 12. This disposes stop paddle 127 in front of the leading edge of the first pair of cartons accumulated behind stop 22.

Energization of solenoid coil SO3F positions four way reversing valve SO3 to conduct pressure to the left-hand side of the piston within expansible chamber motor 136, thus conditioning the motor to "drive" to the right as viewed in Fig. 4. As explained above, pressure regulator PR in line 140 controls the pressure admitted behind the left side of the piston and prevents the pressure from reaching a magnitude which would cause the piston to stroke to the right in Fig. 4.

Solenoid coil SO2D when energized acts through suitable mechanism (not shown) to lower carton stop 22 to permit the assembled cartons to pass from infeed conveyer 16 onto apron 28. Upon the lowering of stop 22, the cartons begin to be driven onto apron 28 by the action of the conveying surface of infeed conveyer 16, however, the friction between the cartons and stationary apron 28 is such that additional force must be applied by pusher paddle assembly 126 before the cartons move a substantial distance onto apron 28. Motor 136 is conditioned so that stop paddle assembly 124 offers a negligible resistance to movements of the cartons and resists this movement only by an amount sufficient to maintain stop paddle 127 in contact with the leading edge of the cartons.

As shaft 102 is rotated from the position shown in Figs. 4 and 5, limit switch 29 is actuated to close contacts LS29a, thus providing an additional circuit to lock in relay R13 through contacts R13b, relay R11 from relay R13 through contacts R10a and relay R5 from contacts R10a through R11b, R13a and R10b. Simultaneously with the closing of contacts LS29a, the striker of limit switch LS28 is engaged to close contacts LS28a.

It will be noted that the foregoing operations were initiated at the time when the final pair of cartons needed to complete the group first broke the light beam between light source 202 and photocell unit 206. As shown in Fig. 1, the angle at which the beam is projected across the conveying surface is such that the beam will be broken for a greater period of time than if the beam were projected across the conveying surface at a 90 degree angle. That is, the beam is initially broken by the leading edge of the carton adjacent guide 26 and remains broken until the trailing edge of the carton clears the beam adjacent side wall 24. The "length" of the carton observed by the photocell unit is its diagonal rather than its longitudinal dimension. This means that an appreciable time delay is obtained between the initial breaking of the beam by the last pair of cartons in the group and the subsequent illumination of the photocell unit after the last group of cartons has moved beyond the light beam. Further, when the machine is handling paired cartons which have been turned by turning device 18, the cartons tend to separate. A beam which was not angled across the conveyer would register the gap between cartons, thus rendering a spurious count.

When the final carton clears the beam, the photocell is again illuminated and contacts PCa are opened to deenergize relay R12. This opens contacts R12a and simultaneously closes contacts R12b to complete a circuit through contacts R5b, contacts R3a, contacts LS28a, contacts R12b, and solenoid coil D3F. D3F acts to cause drive motor D3 to drive in a direction which moves pusher paddle assembly 126 to the right as viewed in Fig. 7. The delay occasioned by the angled light beam assures that pusher paddle 153 is not lowered until all of the cooperating elements are conditioned for the transfer operation. As explained above, rightward movement of pusher paddle assembly 126 cams the paddle 153 to the hidden line position of Fig. 9, see also Fig. 3. Solenoid D3F is locked in through its own contacts D3Fb, which are closed when the solenoid is energized, and normally closed contacts R6a.

Solenoid coil D3F, when energized, opens contacts D3Fa, but coils R11, R5 and R13 still remain locked in through contacts R13b and LS29a. Drive motor D3 drives the pusher paddle at a rate sufficient for it to catch up to the moving cartons, then transfers the cartons from infeed conveyer 16 to apron 28. This phase of the operation is that illustrated in Figs. 1 and 2.

As the pusher paddle assembly moves away from its rest position, cam 198 moves out from beneath the striker of limit switch LS5 and, when the limit switch is cleared, contacts LS5a are opened to de-energize relay R10. De-energization of relay R10 opens contacts R10a to de-energize relay R11. De-energization of relay R11 also de-energizes relay R5 since both contacts R11b and R10b are now open. Contacts R10c are closed upon the de-energization of relay R10, but no action takes place at this time since both contacts R6c and D3Ra are open.

As pusher paddle 153 is driven past carton stop 22, pushing the cartons before it, contact cam 198 engages the striker of limit switch LS6 to close contacts LS6a and energize solenoid coil SO2U which acts to raise carton stop 22 to prevent following cartons from passing on to apron 28.

Drive motor D3 continues to drive the pusher paddle to the right as viewed in Fig. 2 until contact cam 200 (stop paddle assembly) engages the striker of either limit switch LS3 or LS3' (LS6 is held closed for a substantial period of time due to elongation of cam 198). Assuming that limit switch LS3 is conditioned for operation at this time, the engagement of striker 200 with limit switch LS3 closes the contacts LS3a and completes a circuit through these contacts and contacts R13c to energize relay R6. Energization of relay R6 closes contacts R6b and R6c, R6b locking relay R6 in through LS29a. Contacts R6c complete a circuit through closed contacts R10c, contacts R6c and solenoid coil D3R. Closing of relay R6 opens contacts R6a to de-energize solenoid D3F, contacts R5b having been opened upon de-energization of relay R5. Solenoid D3R acts to reverse the direction of drive motor D3 and drive the pusher paddle 126 toward its rest position.

Relay R6, when energized, also closes contacts R6d to energize brake relay B1, thus causing brake 152 to stop shaft 150 and thereby halt stop paddle 127 at the desired location.

Solenoid SO8U is energized simultaneously with solenoid D3R and acts to reverse the connection of four way valve SO8 to condition motor 108 to return shaft 102 to its original position, thus raising stop paddle 127 to its vertical position clear of the transferred cartons. Pusher paddle 153 is also raised by rotation of the shaft, since at this time it is located at somewhere in the narrow portion of keyway 160. As shaft 102 is rotated to its original position, contacts LS29a are opened, thus de-energizing relay R13, thereby opening contacts R13c to de-energize relay R6 opening contacts R6d and releasing brake 152. As contacts LS29a open, contacts LS29b close and a circuit is completed through contacts LS29b and contacts D3Rb (closed upon energization of relay D3R) to energize solenoid coil SO3R, reversing the connections of four way valve SO3 to cause expansible chamber motor 136 to stroke the stop paddle to its rest position. Relay R3 is energized simultaneously with solenoid SO3R, thus closing contacts R3a to lock in solenoid SO3R and relay R3.

As pusher paddle assembly 126 approaches its rest position, cam 198 engages the striker of limit switch LS5, energizing relay R10 and thereby opening contacts R10c to de-energize solenoids D3R and SO8U. De-energization of D3R cuts the circuit to drive motor D3, but sufficient inertia is present to cause pusher paddle assembly 126 to coast the remaining distance to its final rest position which is determined by the abutment of roller 192 and the end of the slot defined by 186—188.

As the stop paddle assembly and pusher paddle assembly return to their rest positions, apron 28 is indexed to move the transferred cartons to a position in which a clear space is provided on the apron for the reception of a subsequent group of cartons. The subsequent group is accumulated by carton stop 22 and transferred to apron 28 in the same manner as described above. Apron 28 again indexes and further groups of cartons are accumulated, transferred and indexed in the same manner until a tier of cartons sufficient to cover the pallet has been collected upon the apron. At that time, suitable mechanism acts to retract apron 28 back beneath side wall 24. Side wall 24 prevents the assembled cartons from following the apron and strips the cartons from the apron, allowing them to drop onto the pallet disposed immediately beneath the apron.

Upon full retraction of apron 28, the pallet supporting mechanism is actuated by full lift control 29 to lower the pallet, together with the tier of cartons thereupon to a new position wherein the upper surface of the tier of cartons occupies the horizontal plane formerly occupied by the upper surface of the pallet. Mechanism for performing this operation is disclosed in my copending application, Serial No. 469,274.

As described above, full lift control mechanism 29 causes the lift to lower until cam 382 (Fig. 18) passes beyond the striker of limit switch LS13. Release of the striker of limit switch LS13 conditions appropriate electrical circuits and mechanism (not shown—see Serial No. 469,274 for example) to halt further lowering of the lift and to drive apron 28 back out over the lift shaft into position to receive the first group of a subsequent tier of cartons. This movement causes apron 28 to raise arm 358 and consequently arm 378 to its original rest position.

At the moment the arm 378 reaches its lowest position, and simultaneous with the disengagement of cam 382 and the striker of limit switch LS13, cam 384 engages the striker of limit switch LS14, closing contacts LS14a and thereby initiating actuation of the closing in guard assemblies. Since the closing of contacts LS14a is only momentary due to the return of apron 28 described above, timing relay T1 is provided to permit sufficient time for the closing in guards to operate. Timing relay T1, when energized, closes contacts T1a to simultaneously energize solenoid coils SO6 and SO13 to reverse the connections of four way reversing valves SO6 and SO13 against the action of the respective springs 282 and 338 (Figs. 13 and 15). Actuation of the respective valves conditions both motors 274 and 330 to drive side closing in guards 30 and 32 and front closing in guard 34 against the sides of the tier of cartons to compact the tier and to center it upon the pallet. In actual practice, speed control valves 341 delay the operation of front closing in guard motor 330 until after the side closing in guards have engaged the cartons. After a predetermined amount of time has elapsed, the timing relay opens, thus opening contacts D1 and de-energizing solenoid coil SO6 and SO13 to reverse the valve connections under the action of the respective springs 282 and 338 which position the valves to retract the closing in guards.

Subsequent tiers of articles are collected upon the apron, transferred to the tier of articles immediately beneath the apron and compacted by the closing in guards after the pallet has been lowered another step. When the pallet is fully loaded, mechanism, such as that disclosed in my copending application Serial No. 469,274 is employed to discharge the fully loaded pallet and to transfer an empty pallet from a source of supply to a position wherein it will receive a first tier of articles operated upon by the pallet loading machine.

While the foregoing description is directed to a specific embodiment of my invention, it will be apparent to those skilled in the art that this embodiment may be modified in certain respects without departing from the inventive concept. Therefore it is to be understood that the foregoing description is exemplary rather than limiting and the true scope of my invention is that defined in the following claims.

I claim:

1. In an article handling apparatus including a conveyer and an article receiving area located at the discharge end of said conveyer; an article transfer assembly for transferring groups of articles from said conveyer to predetermined locations upon said receiving area comprising a first paddle movable from a rest position into engagement with the leading end of a group of articles upon said conveyer and movably longitudinally beyond said discharge end of said conveyer to a location above said receiving area, a second paddle movable subsequent to the aforementioned engagement of said first paddle from a rest position into engagement with the trailing end of said group of articles, means for driving said second paddle to transfer said articles from said conveyer with said first paddle maintained in engagement with said leading end to said receiving area, means for stopping said first paddle to stop movement of said group of articles when said group of articles reach a predetermined location upon said receiving area, and means for subsequently disengaging both of said paddles from said group of articles and returning said paddles to their respective rest positions.

2. In an article handling apparatus including a conveyer and an article receiving apron located at the discharge end of said conveyer; a transfer unit for transferring groups of articles from said conveyer and positioning the transferred groups upon said receiving apron comprising a first paddle movable from a normal position clear of the path of articles being transferred on said conveyer to a second position in the path of articles being transferred on said conveyer, a second paddle movable from a normal position clear of the path of articles being transferred on said conveyer to a second position in the path of articles being transferred on said conveyer, means supporting said paddles for independent movement along an axis parallel to the direction of travel of articles upon said conveyer, means for moving said first paddle from said normal position to said second position to engage the leading end of a group of articles upon said conveyer, means for moving said second paddle from said normal position to said second position and for simultaneously driving said second paddle along said axis to drive said second paddle into engagement with the trailing edge of said group of articles and drive said group of articles from said conveyer to said apron, means operable by said first paddle for reversing the direction of axial movement of said second paddle when said group arrives at a predetermined location upon said apron, and means for returning both of said paddles to their respective normal positions.

3. In an article handling apparatus including a conveyer and an article receiving apron located adjacent the discharge end of said conveyer; an article transfer unit comprising a shaft mounted for rotation about an axis parallel to the direction of movement of articles upon said conveyer, a first paddle mounted upon said shaft for rotation therewith and movable axially of said shaft, a second paddle mounted upon said shaft for axial movement relative thereto and capable of limited rotation relative to said shaft at at least one axial location thereon, means normally locating said shaft at a rotative position wherein both of said paddles are disposed in positions clear of the path of articles upon said conveyer, means for rotating said shaft to a position wherein said first paddle is located in the path of articles being transferred by said conveyer to engage the leading end of an article, means for driving said second paddle, subsequent to the engagement of the leading end of an article by said first paddle, axially of said shaft, means for rotating said second paddle relative to said shaft during the initial portion of the aforementioned axial movement to position said second paddle for engagement with the trailing end of an article upon said conveyer between said first and second paddles, said means for driving said second paddle axially of said shaft being operable to drive articles located between said paddles from said conveyer onto said apron with said first paddle remaining in engagement with the leading edge of the leading article between said paddles, and means responsive to the arrival of the leading article at a selected location on said apron for stopping said first paddle to prevent further movement of the articles between the paddles, disengaging both paddles from said articles and returning both paddles to their respective positions clear of the path of articles on said conveyer.

4. In an article handling apparatus including a conveyer and an article receiving apron located adjacent the discharge end of said conveyer; an article transferring unit comprising a shaft mounted for rotation about an axis parallel to the direction of movement of articles upon said conveyer, a stop paddle keyed to said shaft for rotation therewith and movable axially of said shaft, said stop paddle being normally located on said shaft at a rest position adjacent the discharge end of said conveyer and clear of the path of articles being handled by said conveyer, means for rotating said shaft to rotate said stop paddle into the path of articles being handled upon said conveyer whereby said stop paddle is engaged by the leading end of an article upon said conveyer, means mounted upon said shaft for driving articles from said conveyer onto said apron, thereby moving said stop paddle from said rest position axially along said shaft, brake means actuable upon arrival of said article engaged with said stop paddle at a predetermined location upon said apron to stop further axial movement of said stop paddle away from said rest position, subsequently actuable means for rotating said shaft to rotate said stop paddle clear of said article, and means for subsequently driving said stop paddle axially of said shaft back to said rest position.

References Cited in the file of this patent

UNITED STATES PATENTS

| | | |
|---|---|---|
| 2,220,191 | Wylie | Nov. 5, 1940 |
| 2,228,887 | Peterson | Jan. 14, 1941 |
| 2,393,254 | Leifer | Jan. 22, 1946 |
| 2,508,861 | Jessen | May 23, 1950 |
| 2,652,137 | Taranto | Sept. 15, 1953 |
| 2,662,633 | Kingsley | Dec. 15, 1953 |
| 2,672,079 | Chandler | Mar. 16, 1954 |
| 2,703,182 | Broberg et al. | Mar. 1, 1955 |
| 2,762,487 | Temple | Sept. 11, 1956 |